UNITED STATES PATENT OFFICE.

FREDERIC P. DEWEY, OF WASHINGTON, DISTRICT OF COLUMBIA, ASSIGNOR OF ONE-HALF TO JOHN H. WALTER, OF SAME PLACE.

PROCESS OF TREATING MIXTURES CONTAINING SULFIDS.

SPECIFICATION forming part of Letters Patent No. 561,571, dated June 9, 1896.

Application filed September 6, 1892. Serial No. 445,207. (No specimens.)

*To all whom it may concern:*

Be it known that I, FREDERIC P. DEWEY, a citizen of the United States, residing at Washington, in the District of Columbia, have invented certain new and useful Improvements in Processes of Treating Mixtures Containing Sulfids; and I do hereby declare that the following is a full, clear, and exact description thereof.

The object of my invention has been to provide an improved process of treating mixtures containing sulfids of the precious metals and copper, whereby the gold and silver can be obtained free from copper without the use of high dry heats, as in the ordinary process of refining, and separating silver and gold, which involves roasting or melting with lead; and to this end my invention consists in the process and the parts thereof, as hereinafter specified.

It has been my special purpose to provide a process for the treatment of the sulfid mixtures, which are usually obtained by precipitation, from the solutions resultant from the lixiviation of the ores of precious metals with a solvent solution. Such sulfids as produced by different lixiviation-works vary considerably in composition, according to the character of the ore treated and the process of lixiviation employed; but they usually consist of sulfids of gold, silver, copper, and lead, accompanied by some free sulfur and small amounts of impurities. The amount of lead is often very small, and in the case of some ores such metal is entirely absent from the sulfids.

Generally the proportions of the sulfids of the different metals may be said to be as follows: gold, from a trace to one per cent.; silver, from five to seventy per cent.; copper, from five to twenty per cent., and lead from nothing to fifteen per cent.

The greatest difficulty met with in separating and recovering the silver and gold from these sulfids has been due to the presence of copper, which is a very difficult metal to separate from the precious ones. The processes heretofore employed to secure this separation have been long and costly, both on account of the time, labor, and manipulation needed and the expense of the fuel required for the roasting or melting with lead, which formed part of the treatment, and which, because of the high dry heats used, involved an unavoidable loss of some of the precious metals by volatilization. As distinguished from the said old processes of securing the precious metals free from copper, it will be seen that my process, as described and claimed hereinafter, is an entirely liquid one, which requires no high dry heats, is simple and inexpensive, and, while separating the silver and gold as fine metals without loss of any of the same by volatilization, enables me to recover the copper in a useful form.

While I have hereinbefore described my invention as especially intended for use in the treatment of the mixtures of sulfids such as are obtained from the solutions resultant from the lixiviation of the ores of precious metals, I desire it to be understood that said invention is applicable to and can be used to advantage in the treatment of other sulfid mixtures obtained in other ways than by precipitation from lixiviation solutions.

In carrying out my invention I first place a charge of the mixture of sulfids in an iron pot or kettle and pour over it the requisite quantity of sulfuric acid, marking 50° Baumé or more, and then apply heat to the kettle contents. The amount and strength of the acid required will vary with the difference in the percentages of silver and copper present in the sulfids. In the treatment of what are known as the "Russell" sulfids, containing a little gold, thirty per cent. of silver, twenty per cent. of copper, and small amounts of impurities, I use acid of 66° Baumé, in amount more than sufficient to convert the sulfids into sulfates, so that there will be an excess of the acid to dissolve out the sulfate of silver to separate it from the sulfate of copper in the manner hereinafter described. As the heat is applied the contents of the kettle are stirred frequently until the dark color of the sulfids has disappeared and none of the latter remain unaltered. As the contents of the kettle are warmed up, and while they are at a low temperature, a reaction takes place represented by the formulas, $$Ag_2S + H_2SO_4 = Ag_2SO_4 + H_2S,$$
$$CuS + H_2SO_4 = CuSO_4 + H_2S,$$

the metallic sulfids being transformed into sulfates with the evolution of sulfureted hydrogen. As the application of heat is continued water is driven off, the acid becomes stronger, and the following decomposition takes place:

$$H_2SO_4 + heat = SO_2 + O + H_2O.$$

The $SO_2 + O$ produced by this decomposition react upon the sulfureted hydrogen evolved by the first reaction, as follows:

$$3H_2S + SO_2 + O = 3H_2O + 4S,$$

the hydrogen being oxidized to water with the separation of sulfur in elemental condition. By increasing the heat so as to produce a rapid decomposition of the sulfuric acid into $SO_2 + O + H_2O$, I secure the production of sufficient oxygen to oxidize the sulfur of the sulfureted hydrogen, as indicated by the formula, $$H_2S + 2SO_2 + 3O = H_2O + 3SO_2,$$

both the sulfur and hydrogen of the sulfureted hydrogen being oxidized to produce water and sulfurous-acid gas. As the heat is applied and quickly raised to the point at which the sulfur is oxidized, in the manner set forth above, the several reactions indicated take place so rapidly that the following formulas substantially express the final reaction:

$$Ag_2S + 4H_2SO_4 = Ag_2SO_4 + 4SO_2 + 4H_2O,$$
$$CuS + 4H_2SO_4 = CuSO_4 + 4SO_2 + 4H_2O.$$

The result of the described heating with sulfuric acid is that the metallic sulfids are converted into sulfates of which the sulfate of silver produced, being easily soluble in hot strong sulfuric acid, goes into solution in the excess of acid used, while the sulfates of copper and lead, being insoluble in the acid, are precipitated therefrom to the bottom of the pot or kettle. To insure the settling of the other sulfates besides the silver, the contents of the kettle kept warmed up may be allowed to stand for a while. The solution of sulfate of silver is then drawn, siphoned, or ladled off from the settlings at the bottom of the kettle, and the residue may be washed with strong acid to free it from silver. Where there are large quantities of lead, this supplemental washing has been found desirable to insure the complete extraction of the silver. The solution of sulfate of silver produced by the described treatment of the sulfids is preferably siphoned off into a lead-lined tank and treated for the recovery of the silver by any of the well-known methods, as by copper plates or sulfate of protoxid of iron, &c., the copper-plate method being preferred. The residue in the pot containing gold and sulfates of copper and lead is removed after the solution has been drawn off, and the sulfate of copper is dissolved out with water, leaving the insoluble gold and sulfate of lead which are melted with oxidizing fluxes to secure fine gold. The sulfate of copper dissolved out from the residue by the washing water can be secured from the latter by crystallization. The same method of saving the copper in the valuable form of sulfate is used upon the solution from which the silver has been precipitated when the precipitation is secured, as preferred, by copper plates. The resultant liquor is thus put in condition for use again in the first step of the process used upon another charge of sulfids, the acid being, of course, concentrated where concentration is necessary.

It will be observed that my process as set forth hereinbefore differs from the one described in my other pending application for United States Letters Patent, Serial No. 445,206, filed September 6, 1892, in that in the present process the solution of sulfate of silver in strong sulfuric acid is drawn off, so as to leave the sulfate of copper with the gold and sulfate of lead, and is treated separately to precipitate the silver, while in the carrying out of the other one the water is added to the sulfate-of-silver solution before the separation of the sulfate of copper, so as to bring the sulfate of copper also into solution, and both the dissolved sulfates are drawn off together from the gold and sulfate of lead. In the present process a higher degree of heat can be used sufficient to cause oxidation of the sulfur, while in the other application the degree of heat preferably used is described as a moderate one, not high enough to cause such oxidation.

Having thus described my invention, what I claim is—

1. The process of treating mixtures containing sulfids of silver and copper, which consists in heating them to a temperature at which the sulfur is oxidized, in an excess of sulfuric acid sufficient to convert the sulfids of silver and copper into sulfates, and bring the sulfate of silver into solution outside of the mass of material treated, thereby oxidizing the sulfur, converting the sulfids into sulfates, and bringing the sulfate of silver into solution in the acid outside of the mass of material acted upon, substantially as and for the purpose described.

2. The process of treating mixtures containing sulfids of silver and copper so as to first convert the sulfids of silver and copper into sulfates and then separate the sulfate of silver from the sulfate of copper, which process consists in subjecting the mixture to the action of an excess of heated, strong sulfuric acid, and then separating the liquid from the insoluble residue, substantially as described.

3. The process of treating mixtures containing sulfids of silver and copper, which consists in heating the sulfids with strong sulfuric acid, to convert the sulfids into sulfates, and separating the sulfate of silver in solution from the insoluble sulfate of copper, substantially as described.

4. The process of treating mixtures containing sulfids of silver and copper, which consists in heating the sulfids with strong sulfuric acid, to convert the sulfids into sulfates, separating the resultant solution of sulfate of silver from the insoluble sulfate of copper, and recovering the silver from the sulfate solution, substantially as described.

5. The process of treating mixtures containing sulfids of silver and copper, which consists in heating the sulfids with strong sulfuric acid to convert the sulfids into sulfates, separating the resultant solution from the insoluble sulfate of copper, recovering the silver from the solution, and dissolving out with water the sulfate of copper in the residue left by the removal of the silver-sulfate solution, substantially as described.

6. The process of treating mixtures containing sulfids of silver and copper, which consists in heating the sulfids with strong sulfuric acid, separating the resultant solution containing sulfate of silver from the insoluble sulfates of copper and any other insoluble sulfates resulting from the treatment of the sulfids, recovering the silver from the solution, removing the sulfate of copper in the residue left after the separation of the sulfate-of-silver solution, by means of water, and recovering the sulfate of copper so dissolved out and removed, substantially as described.

7. The process of treating mixtures containing sulfids of silver and copper, which consists in heating the sulfids with strong sulfuric acid, separating the resultant solution of sulfate of silver from the insoluble sulfate of copper, precipitating the silver therefrom by means of metallic copper, separating from the solution the sulfate of copper resultant from the precipitating operation, and using the acid which is left for the subsequent treatment of another charge, substantially as described.

In testimony that I claim the foregoing I have hereunto set my hand this 6th day of September, 1892.

FREDERIC P. DEWEY.

Witnesses:
   CHAS. H. MILLER,
   CHARLES EARL.